US005979282A

United States Patent [19]

Schlatter et al.

[11] Patent Number: 5,979,282

[45] Date of Patent: Nov. 9, 1999

[54] CUTTER-INFEED APPARATUS FOR CUTTING INSTALLATIONS FOR TAPES, IN PARTICULAR MAGNETIC TAPES

[75] Inventors: Manfred Schlatter, Freiburg; Helmut Huber, Bad Peterstal-Griesbach; Walter Kientz, Rheinau; Jochen Unglaube, Kenzingen, all of Germany

[73] Assignee: Emtec Magnetics GmbH, Ludwigshafen, Germany

[21] Appl. No.: 08/909,940

[22] Filed: Aug. 12, 1997

[30] Foreign Application Priority Data

Aug. 12, 1996 [DE] Germany ........................... 196 32 438

[51] Int. Cl.[6] .............................. B23D 19/04; B26D 5/20

[52] U.S. Cl. ................................ 83/425.4; 83/76; 83/499; 83/500; 83/503

[58] Field of Search .................................. 83/76.1, 425.4, 83/76, 948, 497, 499, 500, 502, 503, 508.1, 508.2, 508.3, 698.41, 698.51, 699.51

[56] References Cited

U.S. PATENT DOCUMENTS

| | | | |
|---|---|---|---|
| 3,608,411 | 9/1971 | Schmidt | 83/76 |
| 4,026,176 | 5/1977 | Weiskopf | 83/502 |
| 4,072,887 | 2/1978 | Buschmann et al. | 83/425.4 |
| 4,254,677 | 3/1981 | Evans | 83/499 |
| 4,428,265 | 1/1984 | Bolton | 83/502 |
| 4,464,959 | 8/1984 | Larson | 83/76 |
| 4,516,454 | 5/1985 | Mosburger | 83/425.4 |
| 4,548,109 | 10/1985 | Tokuno et al. | 83/499 |
| 4,580,086 | 4/1986 | Tokuno et al. | 83/499 |
| 4,635,511 | 1/1987 | Shirasu | 83/76 |
| 4,805,506 | 2/1989 | Gosnell | 83/500 |
| 4,809,573 | 3/1989 | Welch | 83/76 |
| 4,922,778 | 5/1990 | Nagai | 83/508.2 |
| 5,125,301 | 6/1992 | Miller et al. | 83/425.4 |
| 5,257,923 | 11/1993 | Kagawa | 83/663 |
| 5,562,008 | 10/1996 | Lordo | 83/76.1 |

FOREIGN PATENT DOCUMENTS

| | | |
|---|---|---|
| 94 10 069 | 10/1994 | Germany . |
| 1 573 035 | 8/1980 | United Kingdom . |

*Primary Examiner*—M. Rachuba
*Assistant Examiner*—Sean Pryor
*Attorney, Agent, or Firm*—Keil & Weinkauf

[57] ABSTRACT

A cutter-infeed apparatus for cutting installations for articles in tape or strip form or film-like articles, circular cutters being fastened on upper and lower shafts and displaced with respect to one another for fixing the cutter infeed, and an electrical insulation between the upper and lower shafts making it possible to detect the cutter contact during infeeding and thereby make the infeeding operation automatable. It is also possible to make the infeeding of the individual cutters or cutter-box cutters such that it can be set depending on the difference in speed of the upper and lower shafts. The apparatus can be used for cutting machines of all types in which thin, uncoated or coated polymer films or metal foils can be cut.

9 Claims, 2 Drawing Sheets

CUTTER-INFEED APPARATUS FOR CUTTING INSTALLATIONS FOR TAPES, IN PARTICULAR MAGNETIC TAPES

BRIEF SUMMARY OF THE INVENTION

The invention relates to a cutter-infeed apparatus for tape-cutting installations, one or more circular cutters being arranged rotationally fixed on an upper shaft and a lower shaft and the one or plurality of circular cutters of one of the shafts, the upper shaft or lower shaft, being infed with respect to the mutually assigned circular cutter or cutters of the other, upper or lower, shaft for the cutting operation.

DESCRIPTION OF THE RELATED ART

DE-A-2 619 085 discloses a cutting apparatus for slitting webs of material which operates on the circular sprung-cutter cutting principle, upper and lower cutter shafts being mounted in end pieces and there being provided setting means, by means of which the cutter shafts can be set with respect to each other, the setting operation being performed manually with the cutting apparatus separated from the cutting machine. Setting of the upper and lower cutters in the axial direction is referred to as infeeding. Thus, in the case of the known cutting apparatus, the infeeding of the cutters can only be performed manually after dissassembly, as also in the case of other known cutting apparatuses, in which the only manual setting can also be performed within the machine.

DE-U 9 410 069 discloses a positioning means for lower cutters on slitting machines, the displaceably secured lower cutters being displaced for setting the distance between the individual cutters, in order to set a generally changing cutting position when there are changing cutting widths. The actual position of the individual cutter edges is in this case detected by laser optics, and a control means is provided for the automatic longitudinal setting of the individual cutter edges. There is no cutter infeeding in the sense of the present invention.

DETAILED DESCRIPTION OF THE INVENTION

It is an object of the present invention to provide a cutter-infeed apparatus for automatic cutter infeeding within the tape-cutting installation.

We have found that, with a cutter-infeed apparatus for tape-cutting installations, one or more circular cutters being arranged rotationally fixed on an upper shaft and a lower shaft and the one or a plurality of circular cutters of one of the shafts, the upper shaft or lower shaft, being infed with respect to the mutually assigned circular cutter or cutters of the other, upper or lower, shaft for the cutting operation, this object is achieved according to the invention by an electrical insulation of one of the shafts, the upper shaft or lower shaft, with respect to the other of the shafts and by a short-circuit detector means between the shafts for detecting the contact between the at least two mutually assigned circular cutters during the infeeding operation.

As a result, cutter contact can be detected with great accuracy and little outlay by forming of a shorting circuit.

In a practical configuration of the apparatus according to the invention, a bush is provided for axially displacing the circular cutter or cutters, which bush is mounted axially displaceably in a holding frame of the upper and lower shafts and is provided at the circumference with an insulating layer, in particular a ceramic layer. This allows an insulation of one of the shafts, the upper shaft or lower shaft, with respect to the other of the shafts to be realized in a simple way.

In a further development of the apparatus according to the invention, there may be provided a control means which, depending on the stored initial diameters of the mutually assigned circular cutters, describes an infeed distance which can be emitted in the form of a signal to the infeed-motion means.

This provides a fully automatic infeed apparatus.

In a further development of the infeed apparatus, the infeed-motion means may receive from the short-circuit detector means a short-circuit signal, for setting the diameter-dependent infeed distance prescribed by the control means.

This permits accurate and reliable infeeding of the cutters. In an expedient development, in the case in which the cutters of the upper and lower shafts are driven with a difference in speed, at a predetermined limit value of the difference in speed the cutter infeed distance set at the given time may be changed, in particular increased, by a predetermined amount. This achieves an optimization of the overall cutting operation.

It is advantageous if an insulating plate is provided in the sliding coupling and the connection lines to the short-circuit detector and to the control means are connected just upstream and just downstream of the insulating plate.

Figure 1:
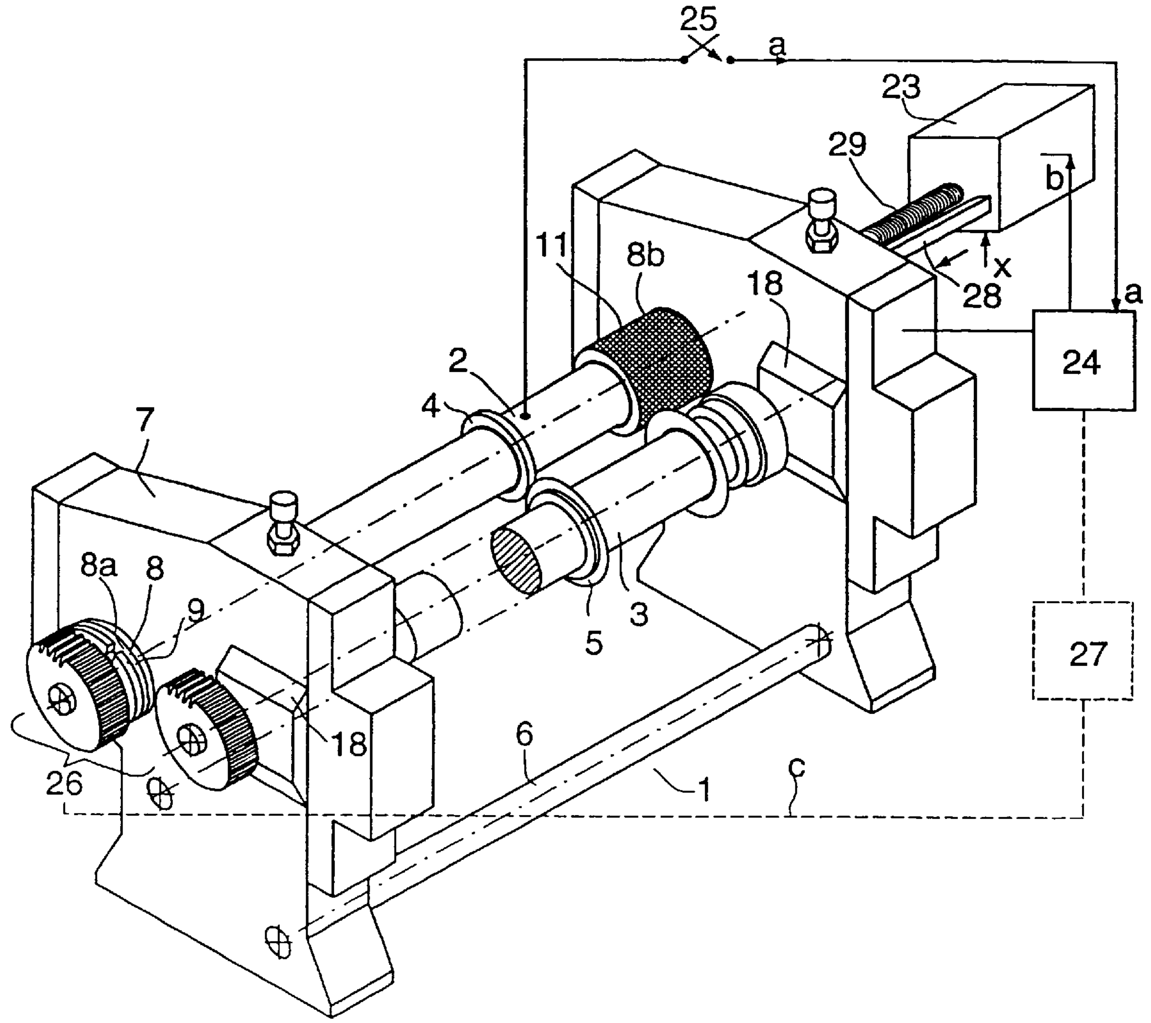
FIG. 1 shows an overall view of the cutting apparatus.

An exemplary embodiment of the infeed apparatus according to the invention in a practical cutting apparatus is described below with reference to drawings:

FIG. 1 illustrates the overall structural design of the cutting apparatus 1 according to the invention, which can be separated from the cutting machine (only partially represented in the drawings) for the setting of the cutter shafts 2, 3 and consequently of the cutters 4, 5. In two end pieces, which are held in a relatively exact position with respect to each other by crossmembers 6 and are referred to as a frame 7, the lower cutter shaft 2 and the upper cutter shaft 3 are mounted.

The lower cutter shaft 2 is held axially and radially without backlash in a rolling-contact bearing *8a*, which is arranged axially displaceably in a bearing bush for setting the lower cutting shaft 2 by means of a bush. During operation of the cutting apparatus, the bush 8 with the rolling-contact bearing *8a* and the bearing bush 9 are releasably connected to one another. The lower cutter shaft 2 may also be guided radially without backlash and axially displaceably, for example by rolling-contact bearings *8b*, which are accommodated in a long bush 11.

Figure 2:
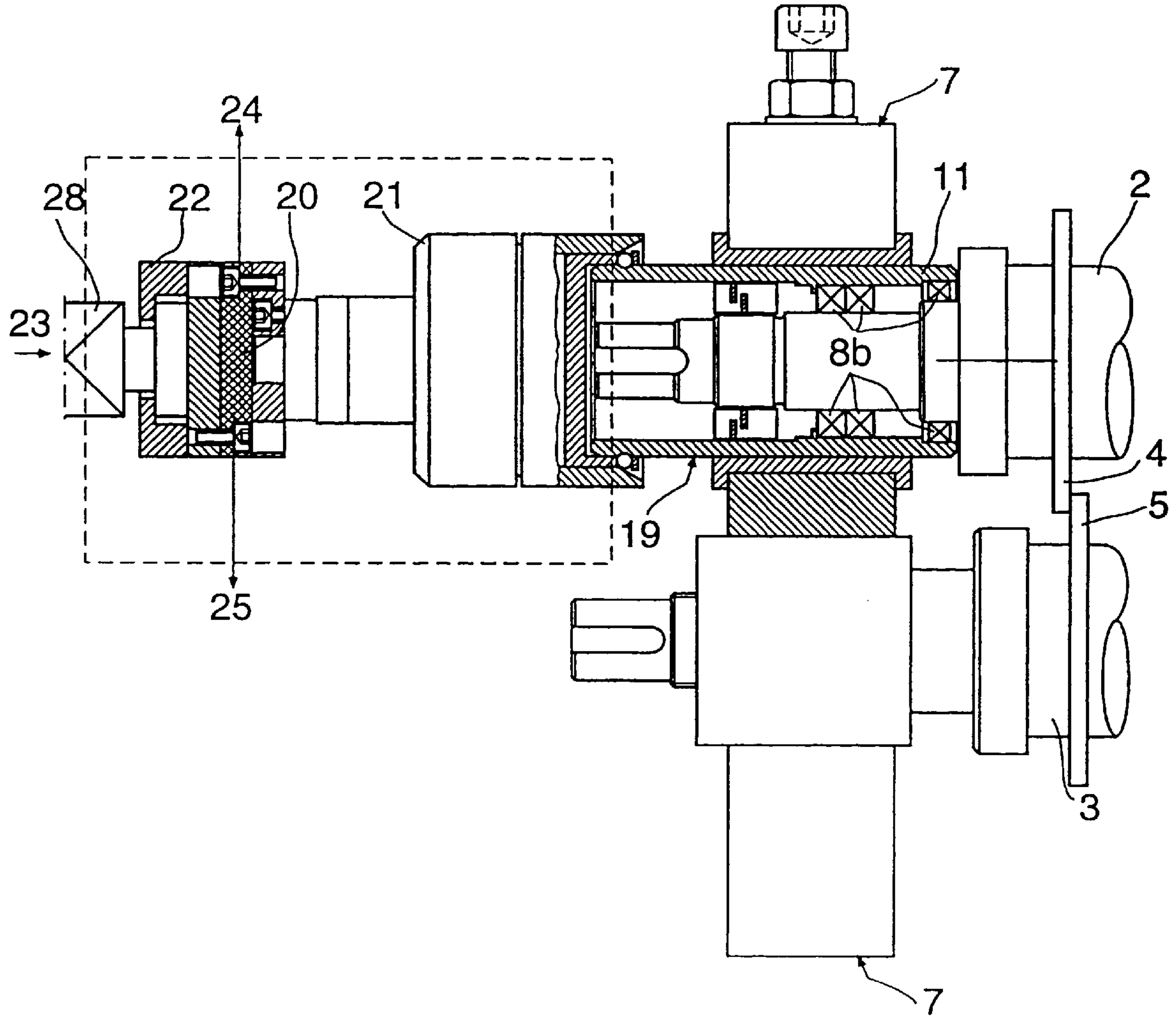
FIG. 2 shows a sectional view of the actuator for the axial displacement of the lower cutter shaft

The bearing bush 9 and the long bush 11 lie in recesses of the frame 7 which are open with respect to the front face of the cutting apparatus (FIG. 2). For the mounting of the upper cutter shaft 3 there are likewise rolling-contact bearings provided. Both bearings are held respectively in a bush 18 (FIG. 1) and are arranged in a recess of the frame 7.

For setting the distance between the two cutter shafts 2, 3, and consequently between the cutters 4, 5, a sliding coupling 21, 22 of the infeed-motion means 23 is provided on the end face of the bush 11.

The fixing or preventing of the adjustment of bearing *8b* and bush 11 is assumed by the infeed-motion means 23, without fixing screws etc. This also eliminates one disadvantage of the known apparatuses, to be specific that when fixing screws or nuts are loosened or tightened there is the risk of damage to the neighbouring cutters or of the previously set position being displaced again.

For establishing the contact between lower cutter 4 and upper cutter 5, which according to the known cutting installation, operating on the basis of the circular sprung-cutter cut described at the beginning, the lower cutter shaft 2 is—as already explained—held axially displaceably by means of the bearing bush 9 and the bush 11 in the recesses of the end pieces of the frame 7. The required displacement is performed, for example, by means of an actuator.

The actuator comprises a prismatic bar 28 (square), which is arranged parallel to a spindle 29, which is provided with a thread. This thread is intended for receiving the balls of a commercially available recirculating ball screw (not represented). Fitted on the recirculating ball screw, i.e. on the nut which cannot move in the axial direction of the cutter shafts, is a worm wheel, (not represented) into which the worm of a worm drive engages. If an infeed motion is then to be performed, the corresponding signal b is sent from the control means 24 into a stepping motor in the infeed apparatus 23, which begins to rotate and consequently rotates the worm, which acts on the worm wheel, which moves the balls of the nut of the recirculating ball screw, causing movement in the axial direction of the recirculating ball screw and consequently also of the prismatic rod 28 and the cutter shaft 2 fixedly connected to it. Inadvertent displacement is prevented by the self-locking of the worm gear mechanism. The travel is monitored only by counting the steps of the stepping motor. With a known transformation of the gear mechanism involved, the displacement travel per step of the motor is also known. This default value is stored in the control means 24.

The actuator, as a prismatic bar 28, is connected to the sliding coupling 21, 22 in such a way that, when it is actuated, the sliding coupling 21, 22 exerts a longitudinal displacing motion on the bush 11.

As indicated in FIG. 1 by the cross-hatching of the surface of the bush 11 and in FIG. 2 by the circumferential layer 19, the bush surface, in particular where it could come into contact with the metal of the frame 7, is to be provided with an electrical insulating material of an adequate resistance value of at least one, in particular more than one, megohm. In addition, there is also provided in the actuator of the infeed-motion means 23 an insulating plate 20, which is likewise intended to have the above minimum resistance value in the material and preferably consists of a suitable plastic. The resistance material may in principle be any suitable coating etc., but it may advantageously also be a ceramic layer, preferably a glass-ceramic or oxide-ceramic layer, which has in addition to the good insulating effect also the advantage of reducing wear during the displacing operation. By this insulation of the two cutter shafts 2 and 3 with respect to each other, the point of contact of the displaced lower cutter or cutters 4 with the upper cutter or cutters 5 can be accurately detected surprisingly simply if metal parts of the cutter shafts 2 and 3 are connected to one another via an electrical circuit (one cable connected to the bearing **8*b*, symbolized by a connection point on the shaft 2, the other to the frame 7, symbolized by the short-circuit detector 25). In FIG. 2, the connection lines to the short-circuit detector 25 and to the control means 24 may be connected, as indicated, at the screws 30, 31, in other words upstream and downstream of the insulating plate 20. The short-circuit switch 25 represents the short-circuit detector means. By a start signal x, the infeed-motion means 23 for displacement actuation of the bush 11 is switched on. If the short-circuit switch 25 is closed, the control means 24 receives a signal a and generates an initiating and infeed-distance control signal b, which is fed to the infeed-motion means 23** and is executed by the latter as an operation. The electrical zero-point detection of the automatic infeed achieves the effect that the zero point is set more accurately.

This function is ensured as follows. The ceramic coating 19 of the bush 11, which bears the lower cutter mounting **8*b*, provides an electrical insulation of the two cutter shafts 2, 3 from each other. The upper cutters 5 on the upper cutter shaft 3 are electrically connected by the metallic contact of the upper cutters 5 with the upper cutter holders (sleeves), the latter are electrically connected by the metallic contact with the shaft 3 and the latter is electrically connected via the balls of the bearing shells and the bearing shells 8*b* are electrically connected with the frame 7 and consequently with the cutting installation. The lower cutter shaft 2 is on the one hand electrically insulated by the ceramic coating 19 with respect to the cutter box frame 7 and the metallic part of the ceramic-coated bush 11 with a screwed-on cable is connected to the short-circuit detector 25 and to the separating-machine control means 24 and the latter is connected to the ground of the cutting installation. If the infeed motion of the infeed-motion means 23 then begins, the resistance owing to the electrical insulation is very great (for example 1 megohm or greater, see above); there is no contact. As soon as the first upper and lower cutters 5, 4 touch, the contact is closed and the resistance becomes virtually zero. With this contact, the distance is reset to zero by means of the short-circuit signal a of the cutter infeed of the control means 24**, and the defined infeed, for example 0.2 mm, by a signal b can begin.

Automatic cutter infeed has several advantages over manual infeed. Firstly, it allows an infeed of the cutter or cutters in the cutting insulation, so that in the case of a cutter box the latter does not have to be fitted with cutters touching, which could cause the cutters to be damaged. In addition, and this is very advantageous in the sense of the invention, there is the possibility of readjusting the cutters even during operation, in other words during cutting, and this can, moreover, be performed automatically by the control means 24 of the cutting installation and without a manual "prompt", for example if due to wear of the cutters 4, 5 the contact pressure and consequently the speed ratios of the two cutter shafts have changed to such an extent that readjustment is recommendable. This of course requires that the control means 24 has the initial diameter value of the cutters stored, by manual input or automatic data input.

In addition, the apparatus according to the invention offers the possibility of setting the infeed for different upper cutter diameters differently and automatically. Since measures against hard metal corrosion of the cutters are used nowadays in a wide diameter range, for example between 120 mm and 94 mm in the external diameter, the available spring excursion of the cutter itself changes by a factor of 2; calculated in each case from the external diameter of the upper cutter to the diameter of the annular restraint. This means that the automatic cutter infeed for the control 24 of the machine decides itself, on the basis of the cutter diameter known to it, whether the infeed to be set first is, in the case of small cutters, for example 0.2 mm and, in the case of large cutters, for example 0.35 mm, depending on the external diameter in question.

Apart from a possible increase in the cutter diameter by the use of larger cutters, there is in the use of the cutting installations a further advantage which can likewise be optimally realized with automatic cutter infeed. Since the cutting edges of the upper and lower cutters are symmetrical (at least in the case of cutter-box systems as described above), after cutting with in each case one upper and lower cutter edge, the lower cutter shaft can be displaced counter to the original infeed direction to the extent that what are respectively the other, previously unused edges of upper and lower cutters touch. Subsequently, infeeding is carried out again as in the case of the used pair of edges, but in the opposite direction. Consequently, the cutters can be used twice in succession in a cutting installation without disassembling the cutter box, as is required in the case of all previous systems. This reduces both the downtimes of the machines and the assembly costs for the cutters. The change from one side to the other may be performed fully automatically by the control means 24 and the infeed-motion means 23.

Measurement results provide data on the setting of the cutter shafts 2, 3 which can be compared with the cutting results, so that for example the setting of the cutter shafts can be optimized by means of a statistical evaluation. Furthermore, the displacement travel of the lower cutter shaft 2 provides information on the accuracy of the distance dimensions of the lower and upper cutters 4, 5 or on the condition of the cutters, since the force necessary for a specific displacement path depends on the number of lower and upper cutters simultaneously coming into contact.

The upper cutter shaft 3 is driven in the previously customary way by an electric motor, while the lower cutter shaft 2 is driven in the case of the apparatus according to the invention by means of a commercially available precision-control gear mechanism 1. The gear wheels 26 in FIG. 1, with a predetermined transformation ratio, serve for driving the lower cutter shaft 2 by the upper cutter shaft 3. This precision-control gear mechanism 26 makes an exact balancing of the cutter speeds possible, which is of significance in particular when changing the diameters of the upper cutters 5 after their regrinding. This expedient configuration of the cutter shaft drive has an advantageous effect on the cutting quality and the service life of the lower and upper cutters.

It goes without saying that the upper cutter shaft 3 may be driven and the lower cutter shaft 2 taken along by cutter contact. It is also readily possible for the lower cutter shaft 2 to be driven and the upper cutter shaft 3 to be "taken along" by the cutter contact, although then the latter would also have to be displaceably designed. The drive of the shafts can also be realized by different types of drive, for example by means of an electronic drive control.

If, therefore, a difference in speed between lower cutter shaft and upper cutter shaft is assumed, and if there is a predetermined limit value of this difference in speed, it is advantageous to utilize the control means 24, to which the speed differential is constantly being input manually or automatically, for example via a difference-forming means 27, in order to use this information for increasing the cutter infeed distance, likewise up to a limit value. The means 27 is diagrammatically joined to the gear mechanism 26 via the line of action c. This makes it possible in interaction with the difference of speed of the upper and lower cutters to optimize the conditions between the cutters in terms of force and friction.

The invention has been described for the case of a cutter box, that is to say a cutter shaft having a plurality of parallel cutters. An infeeding of individual cutters on the basis of the same features is also likewise possible and advantageous.

This apparatus described has been successfully used cost-effectively for the cutting of webs of magnetic film into individual magnetic tapes.

The invention relates to a cutter-infeed apparatus for cutting machines for articles in tape or strip form or film-like articles, circular cutters being fastened on upper and lower shafts and displaced axially with respect to one another for fixing the cutter infeed, and an electrical insulation between the upper and lower shafts making it possible to detect the cutter contact during infeeding and thereby make the infeeding operation automatable. It is also possible to make the infeeding of the individual cutters or cutter-box cutters such that it can be set depending on the difference in speed of the upper and lower shafts. The apparatus can be used for cutting machines of all types in which thin, uncoated or coated polymer films or metal foils can be cut.

We claim:

1. A cutter-infeed apparatus for tape-cutting installations (1), comprising a circular cutter (5) rotationally fixed on an upper shaft (3), a circular cutter (4) rotationally fixed on a lower shaft (2), said cutter (4) being mutually assigned to the cutter (5) on the upper shaft (3), an electrical insulation (19) of one of the shafts, the upper shaft (3) or lower shaft (2) with respect to the other of the shafts (3,2), and a short-circuit detector (25) between the shafts (2,3) for detecting contact between the cutter (5) on the upper shaft and the mutually assigned cutter (4) on the lower shaft during operation of the apparatus.

2. The apparatus of claim 1, further comprising a bush (11) for axially displacing the circular cutter (4), which bush is mounted axially displaceably in a holding frame (7) of the upper and lower shafts (3, 2) and has a circumference wherein the insulation (19) is at the circumference.

3. The apparatus of claim 1, further comprising an infeed-motion means (23), a sliding coupling (21, 22), an insulating plate (20), a control means (24), first connecting lines between the short-circuit detector (25) and a point directly upstream of the insulating plate (20), and second connecting lines between the control means (24) and a point directly downstream of the insulating plate (20).

4. The apparatus of claim 1, further comprising a control means (24) which stores the initial diameters of the mutually assigned circular cutters (4, 5) of the upper and lower shafts (3, 2) and derives therefrom a diameter-dependent infeed distance, which can be emitted in the form of a signal (b), and after receipt of a short-circuit signal (a), to an infeed-motion means (23).

5. The apparatus of claim 1, wherein the cutters (3, 2) of the upper and lower shafts (5, 4) are driven with a difference in speed and, at a predetermined limit value of the difference in speed, the cutter infeed value set at the given time is changed by a predetermined amount.

6. The apparatus of claim 1, further comprising a bush (11) for axially displacing the circular cutter (4), which bush is mounted axially displaceably in a holding frame (7) of the upper and lower shafts and has a circumference wherein the insulation is at the circumference, an infeed-motion means, a sliding coupling (21, 22), an insulating plate (20), a control means (24), first connecting lines between the short-circuit detector (25) and a point directly upstream of the insulating plate (20), and second connecting lines between the control means (24) and a point directly downstream of the insulating plate (20).

7. The apparatus of claim 6, wherein the control means stores the initial diameters of the mutually assigned circular cutters of the upper and lower shafts (3, 2) and derives therefrom a diameter-dependent infeed distance, which can be emitted in the form of a signal (b), and after receipt of a short-circuit signal (a), to the infeed-motion means (23).

8. The apparatus of claim 2, wherein the insulating layer (19) is a ceramic layer.

9. The apparatus of claim 2, further comprising a control means (24) which stores the initial diameters of the mutually assigned circular cutters (4, 5) of the upper and lower shafts (3, 2) and derives therefrom a diameter-dependent infeed distance, which can be emitted in the form of a signal (b), and after receipt of a short-circuit signal (a), to an infeed-motion means (23).

* * * * *